Feb. 24, 1953 A. E. ANDERSON ET AL 2,629,771

BAND-WIDTH REDUCTION SYSTEM

Filed Aug. 31, 1950 2 SHEETS—SHEET 1

INVENTORS A. E. ANDERSON
R. W. SEARS

BY Hugh S. Wertz

ATTORNEY

BAND-WIDTH REDUCTION SYSTEM

Filed Aug. 31, 1950 2 SHEETS—SHEET 2

INVENTORS A. E. ANDERSON
R. W. SEARS
BY Hugh S. Wertz
ATTORNEY

Patented Feb. 24, 1953 2,629,771

UNITED STATES PATENT OFFICE 2,629,771

BAND-WIDTH REDUCTION SYSTEM

Alva Eugene Anderson, Mountainside, and Raymond W. Sears, West Orange, N. J., assignors to Bell Telephone Laboratories, Incorporated, New York, N. Y., a corporation of New York Application August 31, 1950, Serial No. 182,504

5 Claims. (Cl. 178—44)

Figure 1:
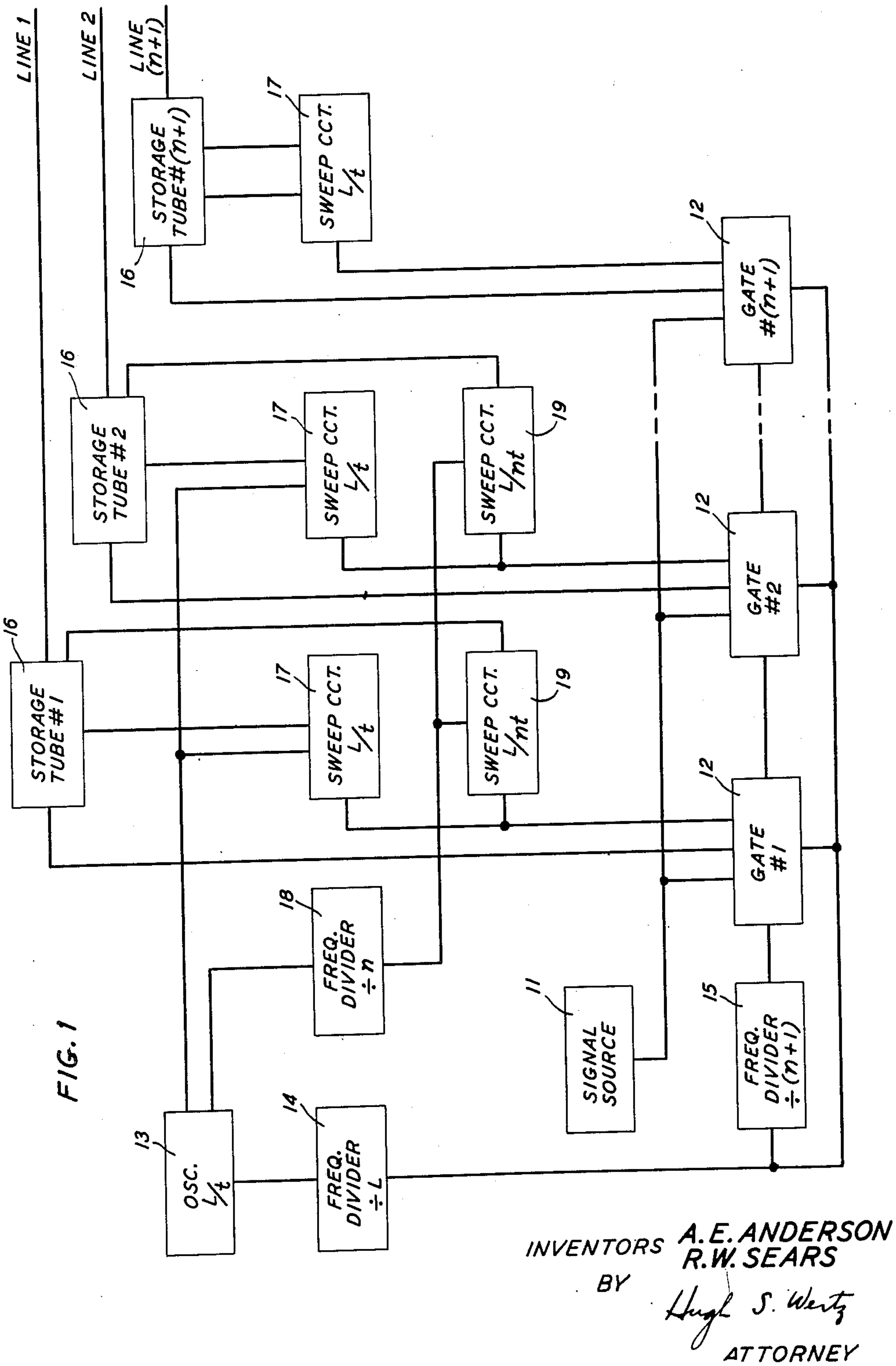

This invention relates to transmission systems and more particularly to systems for multipath transmission at a reduced band-width.

One object of this invention is to transmit signal intelligence at a reduced band-width.

It has been known hitherto that by dividing signal information which is ordinarily to be transmitted over a single channel between a multiplicity of parallel channels, the divided portions of the signal information can be transmitted over the separate parallel channels at a reduced band-width with no overall loss of signal information. This technique is especially important in the wire transmission of high frequency signals since the use of conductors with a limited frequency band is often either desirable or necessary. For example, in the transmission of video signals by means of a coaxial cable, the band-width limitations of such cables make it very desirable that such transmission be at a reduced band-width. Multipath transmission over such cables at a reduced band-width offers possible advantages of increased fidelity in transmission and of reduced complexity in the terminal equipment necessary to such systems. As another example, a group of low-quality telephone channels can be combined in such an arrangement to provide a high-quality channel. From these examples, it is evident that multipath transmission at reduced band-width has wide applicability in the transmission of signal intelligence.

However, arrangements proposed hitherto for such multipath transmission have either been extremely complex with little attention paid to the simplicity necessary for a workable arrangement, or else have by-passed the details important for dependable and satisfactory operation.

Accordingly another object of the present invention is to provide a simplified system for multipath transmission at reduced band-widths.

One of the important factors contributing to the complexity of such previous arrangements has been the difficulty in providing the necessary switching for the distribution of the signal information to the various separate transmission channels. In such distribution it is important that the timing and coordinating be held to quite close limits for satisfactory operation.

Accordingly another object is to improve the switching for the apportionment to and collection from the various separate transmission channels.

To this end, an important part of the present invention is a sequential "chain" type electronic switch for the control of distribution and collection processes.

It has been proposed heretofore that storage devices be utilized for frequency conversion in band-width reduction systems. However, such systems have necessitated elaborate switching and timing arrangements for the storing and reading processes. In the present invention, considerable simplification is achieved in the use of such devices by keeping the storing and reading processes distinct and by the utilization of a sequential electronic "chain" type switch for control thereof. In this way, it is possible to use a single scanning beam both for the storing and reading processes. It will be appreciated that considerable simplification of circuitry can be realized thereby.

The above and related objects are realized in a transmission system in accordance with the invention in which: at the transmitter, signal information is supplied through a chain gating circuit to a plurality of storage devices; the gating circuit operates to distribute intervals of the signal information in turn to each of the storage devices for storage therein; in each device the stored portion of the signal is subsequently recovered at a reduced band-width and thereafter transmitted by means of a separate transmission path to the receiving terminal to be applied to a storage device associated with each transmission path for the storage of the signal interval transmitted therein; and thereafter the stored intervals are subsequently recovered at the original frequency and combined to provide a facsimile of the original signal.

Figure 2:
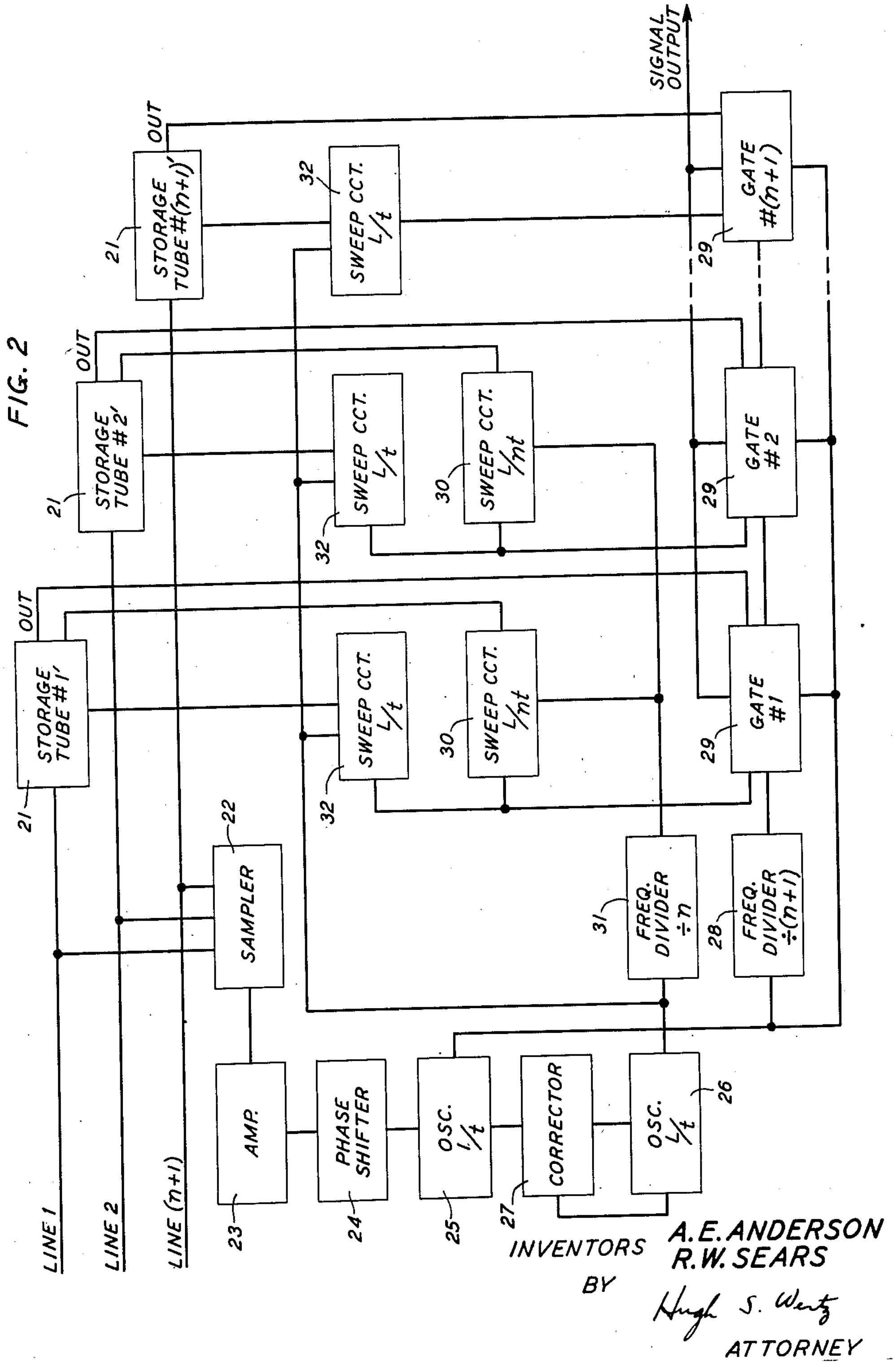

The invention will be better understood by reference to the following more detailed description taken in connection with the accompanying drawings forming a part thereof in which:

Figs. 1 and 2 show, in block schematic form, transmitting and receiving terminals, respectively, of an exemplary embodiment of a system in accordance with the invention.

With reference more particularly to the drawings, in the transmitting arrangment 10 of Fig. 1, a signal source 11 provides the input signal information. The signal information is supplied to the storage channels by way of a plurality of "gates" 12 which form a "chain" type gating system for control of the distribution and allocation thereof in a manner to be described more fully hereinafter. Each storage channel comprises a storage device 16 wherein is effected the time-base conversion necessary for band-width reduction. A preferred form of such a device, and the one with reference to which this exemplary embodiment of the invention will be more particularly described, is known in the art as a storage tube, whereof a suitable type is described in the copending application of R. W. Sears, Serial No. 38,125, filed July 10, 1948. Such storage tubes are adaptable for frequency conversion of signal information by storing at a first rate and by subsequent reading at a second, higher or lower, rate. The storing and reading rates are determined by the frequencies of sweep circuits which control the storing and reading processes. By properly adjusting the ratio of the sweep times of the storing and reading intervals, there can be effected either an increase or decrease, as desired, in the band-width of the stored information. Since there is one storage channel associated with each of the plurality of transmission paths, for simplicity, a separate storage tube 16 has been provided for each transmission channel, though it will be evident that complex storage devices can be devised for providing a multiplicity of storage channels. For example, there can be designed storage tubes which include a multiplicity of storage surfaces for multiple storage channels. Moreover, in accordance with one aspect of the invention, this illustrative embodiment has been designed so that in each channel there is no overlapping of the storing and reading cycles, with the advantages pointed out hereinabove. For that reason, there are provided $(n+1)$ storage devices, where $n$ is the factor of frequency band-width conversion desired, so that at any one instant $n$ devices will be storing while in the remaining channel the signal is being read. Other arrangements are feasible which utilize multiple scans whereby the storing and reading processes can be coincident, or additional storage devices can be utilized to provide intervals for the insertion of additional information or to provide idle intervals for each storage device in turn.

An oscillator 13 serves as the primary source for the control pulses, preferably of rectangular wave form, which are utilized by the synchronizing and gating circuits. The frequency of this oscillator is locked at a frequency $$\frac{L}{t}$$

where L is the number of scanning lines in one frame of the storage process in a manner analogous to the lines in a frame of television signals, and $t$ is the period of time into which the signal information is divided for storage in the various storage channels. L can have a wide range of values, a figure of several hundred usually being preferable, although it may be advantageous for L to be as low as one. The period $t$ determines the interval $nt$, which is the time during which the signal information remains stored in the process of frequency conversion. This interval $nt$ must be made well within the limits for stable storage determined by the retentivity characteristics of the storage tubes utilized. The output of the oscillator 13 is supplied to the frequency divider 14 for division by the factor L to produce a rectangular wave signal of frequency $1/t$, the storage frame rate. The output of the divider 14 is thereafter supplied to the divider 15 for division by the factor $(n+1)$ to provide another rectangular wave pulse of period $t/(n+1)$ which represents the interval during which each of the storage tubes stores its corresponding portion of the signal information.

Control of the allocation of the signal information is achieved by means of timing or gating pulses distributed in commutator fashion to the several storage devices. For this purpose there is provided a gate circuit 12 associated with each of the storage tubes 16. The gate circuits are two-position multivibrators which are tripped in turn from an "on" position for supplying a rectangular wave pulse of a particular polarity for whose duration the signal path to the associated storage tube is effectively closed permitting storage thereon to an "off" position for supplying a rectangular pulse of opposite polarity during which the signal path to the associated storage tube is maintained open or blocked whereby the storage device is unresponsive to further signals. One convenient expedient for such an effect is to use the rectangular gating pulses on a control grid of an amplifying stage which can be incorporated as part of the gate whereby an "on" pulse permits conduction therethrough while an "off" pulse cuts off this stage and serves to open the path. The gates 16 are arranged to operate in a so-called "chain" fashion. In such an arrangement, a control pulse initiates the operation by triggering or "enabling" the first gate. Thereafter the remaining stages are fired successively along the chain, each by the action of the preceding stage until the last stage is reached, at which time another pulse to the first stage initiates another similar cycle of operation. For application to the present invention, the action of gate No. 1 is initiated by a pulse of frequency $1/t$ from the divider 14. This pulse enables the gate No. 1 to its "on" position. During this time the signal path to storage tube No. 1 is closed, permitting conduction to and storage therein. Then, after an interval $t/(n+1)$, determined by the period of the output of divider 15, a pulse therefrom disables gate No. 1, restoring it to its "off" position. Gate No. 1 is maintained in an "off" position for a period $nt$ after which time it is restored by the next enabling pulse from the divider 14. During this "off" interval, the signal path to the storage tube No. 1 is open providing isolation of the signal source. As gate No. 1 is disabled, the termination of its rectangular pulse is effective to trigger and enable the next stage gate No. 2 of the chain. This process is repeated to the end of the chain, gate No. $(n+1)$, each stage except the first being enabled by the preceding stage of the chain. The circuit constants of each of the gate circuits 12 are adjusted to obtain square pulses of equal periods of $t/(n+1)$ duration. It is possible to obtain more precise timing both as to duration and time of occurrence of the gating pulses by introducing into each of the gating circuits 12 a synchronizing signal derived from the frequency divider 15. Such a chain switching arrangement is described in greater detail in United States Patent 2,486,491, issued to L. A. Meacham on November 1, 1949.

An essential step in the utilization of the invention is the storing of the separate portions of the signal information and the recovery thereof at the reduced band-width preliminary to transmission. The storing process in each device takes place for the interval $t/(n+1)$ during which its associated gate is in the "on" position. As is familiar in the storage tube art, the information to be stored is deposited by scanning the storage element in accordance therewith and the stored information is recovered by a subsequent scanning. For band-width reduction by frequency conversion, it is necessary to provide a fast sweep rate for depositing the signal information and a slow sweep rate for the reading thereof. To obtain a reduction by the factor $n$ each storage device is provided with a circuit for producing fast storage sweeps of rate $1/t$ and slow reading sweeps of rate $1/nt$. The fast sweep circuit 17 is supplied directly with rectangular synchronizing pulses from the oscillator 13. Each of the sweep circuits is controlled by its corresponding gate circuit 16 so that a fast sweep pulse is initiated in each device coincident with the closing of the signal path thereof permitting conduction of the signal information and is terminated thereafter coincident with the opening of the path. The various fast sweep circuits are operated in turn in synchronism with the opening and closing of the associated gates. For the reading operation, to obtain the desired frequency reduction factor $n$, it is necessary to provide circuits of the slow sweep rate $L/nt$. To supply the necessary sweep voltages, a portion of the output of the oscillator 13 is supplied to the divider 18 which divides by the factor $n$ and provides pulses of rate $L/nt$. These pulses are used to control the various slow sweep circuits 19 at this rate. To maintain the proper timing each of the sweep circuits 19 is controlled by a corresponding gate circuit. The sweep circuits 19 are arranged to control the scanning process of the storage device during the reading interval of a complete cycle. Therefore, it can be seen that each gating circuit 12 is used to provide to the storage device the fast and slow sweep rates in synchronism with the "on" and "off" positions and the closing and opening of the path from the input source to the storage tubes. In each interval $(n+1)t$, each storage tube will be storing for an interval $t$ and will be read in the subsequent interval $nt$. The signals derived by the reading scan are supplied from each storage device to an associated line for transmission to the receiving terminal. It will be evident from the foregoing description that at any one instant, $n$ of the $(n+1)$ lines will be transmitting signal information, the odd line at any instance corresponding to the storage channel wherein the signal information is currently being stored.

At the receiving terminal there must be provided a complementary system to perform the reciprocal function of converting the various signal portions transmitted to the original bandwidth and of thereafter combining the separate signals into one integral signal which should be a facsimile of the original signal supplied by the signal source. In Fig. 2 there is shown an exemplary embodiment therefor in accordance with the invention. Each of the various signal portions transmitted are individually supplied to a corresponding storage device 21 which preferably is a storage tube similar to that employed at the transmitter. In order to maintain proper synchronism during the recovery and integration of the signal portions, it is necessary to provide a timing pulse of period $t$ in synchronism with the timing pulse at the transmitter. Various arrangements are possible therefor. By way of example, there is illustrated one such arrangement in which each of the transmission lines are sampled by means of the sampler 22. As discussed hereinbefore, each of the $(n+1)$ lines is transmitting a signal pulse of length $nt$, and the signal pulses in each line are displaced by a time $t$ from the corresponding pulses in the preceding line. It is evident therefore that by adding the various samples there can be derived an output having the periodicity $t$. This output is supplied to the amplifying stage 23 and the phase shifter 24 which permits phase adjustment thereof as may be desired preliminary to utilization for controlling the oscillator 25, which preferably provides a rectangular wave output at the frequency $1/t$ which is the base frame-rate.

There is also necessary a synchronizing pulse of frequency $L/t$ to insure the proper line scanning. For this purpose, there is provided an oscillator 26 of frequency $L/t$. To insure the necessary time relationship and maintain good synchronization with the oscillator 25, portions of the output of each are supplied to the correcting circuit 27 wherein the two outputs are compared and any necessary correction is derived as an output signal which is supplied to the oscillator 26 to maintain the desired relationships, in a manner known in the television art for maintaining the proper relationship between line and frame rates. It should be realized that there are other methods by which synchronizing pulses may be derived and that the one described here is merely exemplary.

As in the transmitter, there is utilized a "chain" type gating circuit for maintaining the proper sequential control in the integration process. The output of the oscillator 25 is supplied to the divider 28 for producing rectangular pulses having a periodicity $t/(n+1)$ for utilization in the gating control. As hereinabove described, the gating control is achieved by means of a plurality of gates 29, of which there is one associated with each of the storage tubes 21. Each transmitted signal portion is stored in its corresponding storage tube for the signal interval $nt$ at a slow sweep rate $L/nt$ set by the sweep circuit 30. The oscillator 26 supplies the divider 31 which provides the necessary synchronizing square pulses of frequency $L/nt$ for the control of the sweep circuit 30. For the band-width expansion necessary to obtain signal portions of the original frequency, the stored signals must be read at a proportionately faster rate. To this end, the oscillator 26 supplies the necessary synchronizing pulses to each of the sweep circuits 32 for providing a sweep output of frequency $L/t$ for control of the scan in its corresponding storage tube. The gating circuits 29 operate in the manner described hereinbefore for providing the gating control whereby each storage tube is stored for an interval $nt$ and is read sequentially for succeeding intervals of $t$. Each gating circuit also is utilized to alternate the slow and fast sweeps in synchronism with the storing and reading processes in the manner described in connection with the transmitting terminal. If the necessary synchronization is maintained throughout, it will be evident that there will be derived from the separate gates in turn, signal intervals corresponding to the signal intervals stored in the separate storage devices 16 in the transmitter shown in Fig. 1. An addition of these derived signals will produce a facsimile of the original signal without any loss in signal information.

It is to be understood that the arrangements described are illustrative of the invention. Other arrangements can be devised without departing from the spirit and scope of the invention.

What is claimed is:

1. A multipath transmission system for reducing band-width comprising a transmitting terminal, a receiving terminal and a plurality of transmission channels therebetween, in which the transmitting terminal comprises a signal source, a plurality of storage channels, means for storing successive intervals of said signal in each of said storage channels in turn, means for deriving from each of said storage channels at a time subsequent to the storing of a reduced band-width the stored interval of signal, and means for supplying each of the signal intervals derived from said storage channels to an associated transmission channel for transmission to the receiving terminal, and in which the receiving terminal comprises a storage channel for each transmission channel, means for storing each of the intervals of signal transmitted in the corresponding storage channel, means for deriving from each of said storage channels in turn at a time subsequent to the storage a facsimile of an original signal interval, and means for combining the signal intervals derived into a facsimile of the original signal.

2. A system for multipath transmission at a reduced band-width comprising a transmitting terminal, a receiving terminal and a plurality of transmission channels therebetween, in which the transmitting terminal comprises a signal source, a plurality of storage channels, a chain gating circuit having a gate associated with each storage channel, means for supplying the signal to said chain gating circuit, means for distributing equal successive signal intervals for storage in successive storage channels, means for deriving from each of said storage channels the stored interval at a reduced band-width, and means for supplying each of the signal intervals derived from said storage channels to an associated transmission channel for transmission to the receiving terminal, and in which the receiving terminal comprises a storage channel for each transmission path, means for storing each of the intervals of signal transmitted in the corresponding storage channel, a chain gating circuit having a gate associated with each storage channel, means for operating the chain gating circuit for deriving from each successive storage channel a facsimile of an original signal interval, and means for combining the signal intervals derived into a facsimile of the original signal.

3. A system for multipath transmission at a band-width reduced by a factor $n$, where $n$ is any integer, comprising a transmitting terminal, a receiving terminal, and a plurality of transmission paths therebetween, in which the transmitting terminal comprises a signal source, $(n+1)$ storage devices, means for storing successive intervals of said signal in each of said storage devices in turn, means for deriving from each storage device the stored signal interval at a band-width reduced by the factor $n$, means for supplying each of the $(n+1)$ signal intervals derived from said devices to an associated transmission path for transmission to the receiving terminal, and in which the receiving terminal comprises $(n+1)$ storage devices, each associated with one transmission path for storing the signal interval transmitted therein, means for deriving from each of storage devices in turn a facsimile of an original signal interval, and means for combining the signal intervals derived into a facsimile of the original signal.

4. Apparatus for the multipath transmission of signal information at a band width reduced by a factor $n$ where $n$ is a positive integer comprising an input signal source, $(n+1)$ storage devices, each including means for storing input signals and for subsequently reading the stored signals, a sequential chain switch including $(n+1)$ gating circuits, one associated with each storage device, a source of timing pulses, means for dividing each timing pulse into $(n+1)$ synchronizing pulses, means for applying said synchronizing pulses to the chain switch for actuating each gating circuit in turn and thereby switching each storage device from a storing to a reading operation, for the duration of a timing pulse, each storage device being in a storing state for the time of one synchronizing pulse and in a reading state for the time of $n$ synchronizing pulses, and $(n+1)$ transmission paths, one associated with each storage device for the transmission of its read output.

5. Apparatus for the multipath reception of signal information comprising $(n+1)$ transmission paths each supplying signal information, $(n+1)$ storage devices, each associated with a separate transmission path and including means for storing input signals and for subsequently reading the stored signals, a sequential chain switch including $(n+1)$ gating circuits, one associated with each storage device, a source of timing pulses, means for dividing each timing pulse into $(n+1)$ synchronizing pulses, means for applying said synchronizing pulses to the chain switch for actuating each gating circuit in turn and thereby switching each storage device from a storing to a reading operation, for the duration of a timing pulse, each storage device being in a storing state for the time of $n$ synchronizing pulses and in a reading state for the time of one synchronizing pulse, and a common output circuit supplied in turn with the read output of each storage device.

ALVA EUGENE ANDERSON.
RAYMOND W. SEARS.

REFERENCES CITED

The following references are of record in the file of this patent:

UNITED STATES PATENTS

| Number | Name | Date |
|---|---|---|
| 1,671,143 | Campbell | May 29, 1928 |
| 2,275,224 | Henrotean | Mar. 3, 1942 |